May 4, 1937.                B. E. RICHARDSON                2,079,529
           CONTROL MECHANISM FOR CHANGE SPEED GEAR TRANSMISSIONS
                    Filed May 17, 1935          5 Sheets-Sheet 1
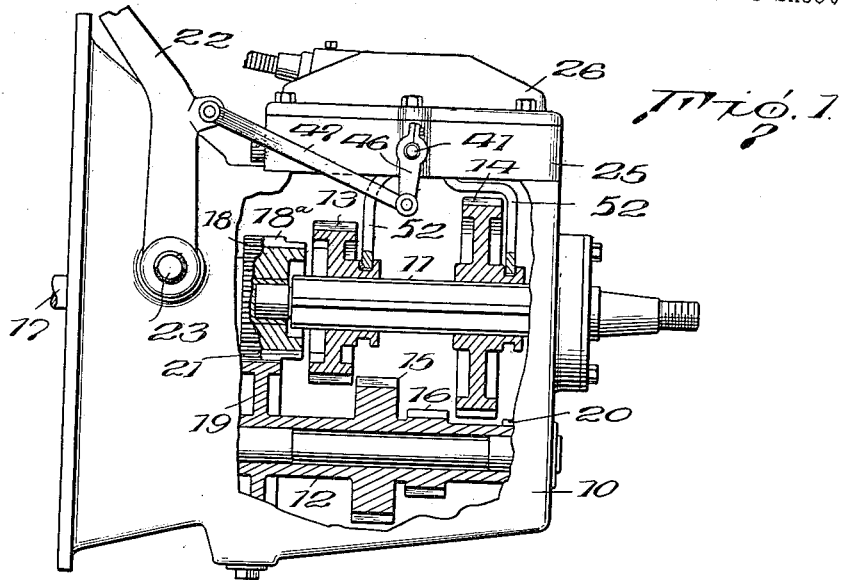
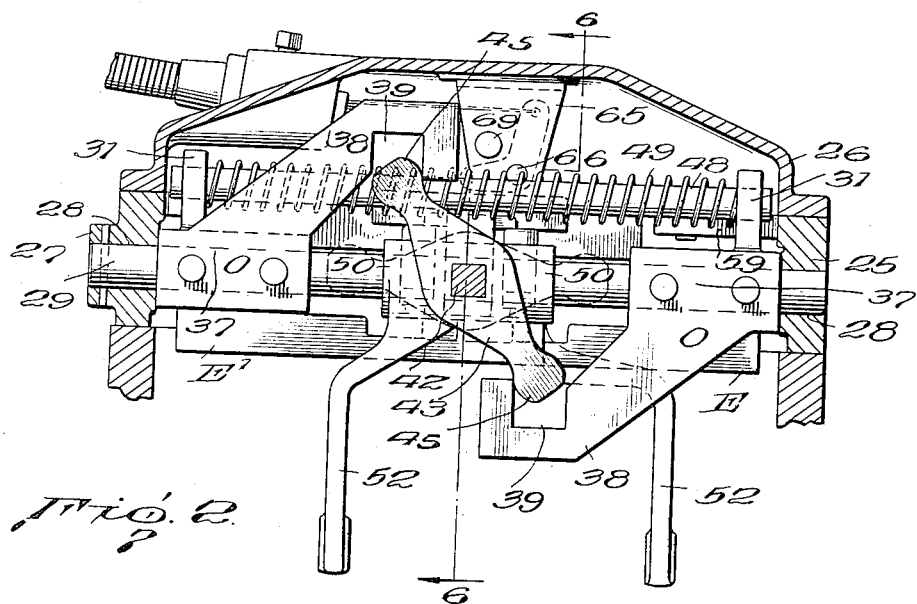
Inventor
Bayard E. Richardson,
By Wm B. Hodges
Attorney

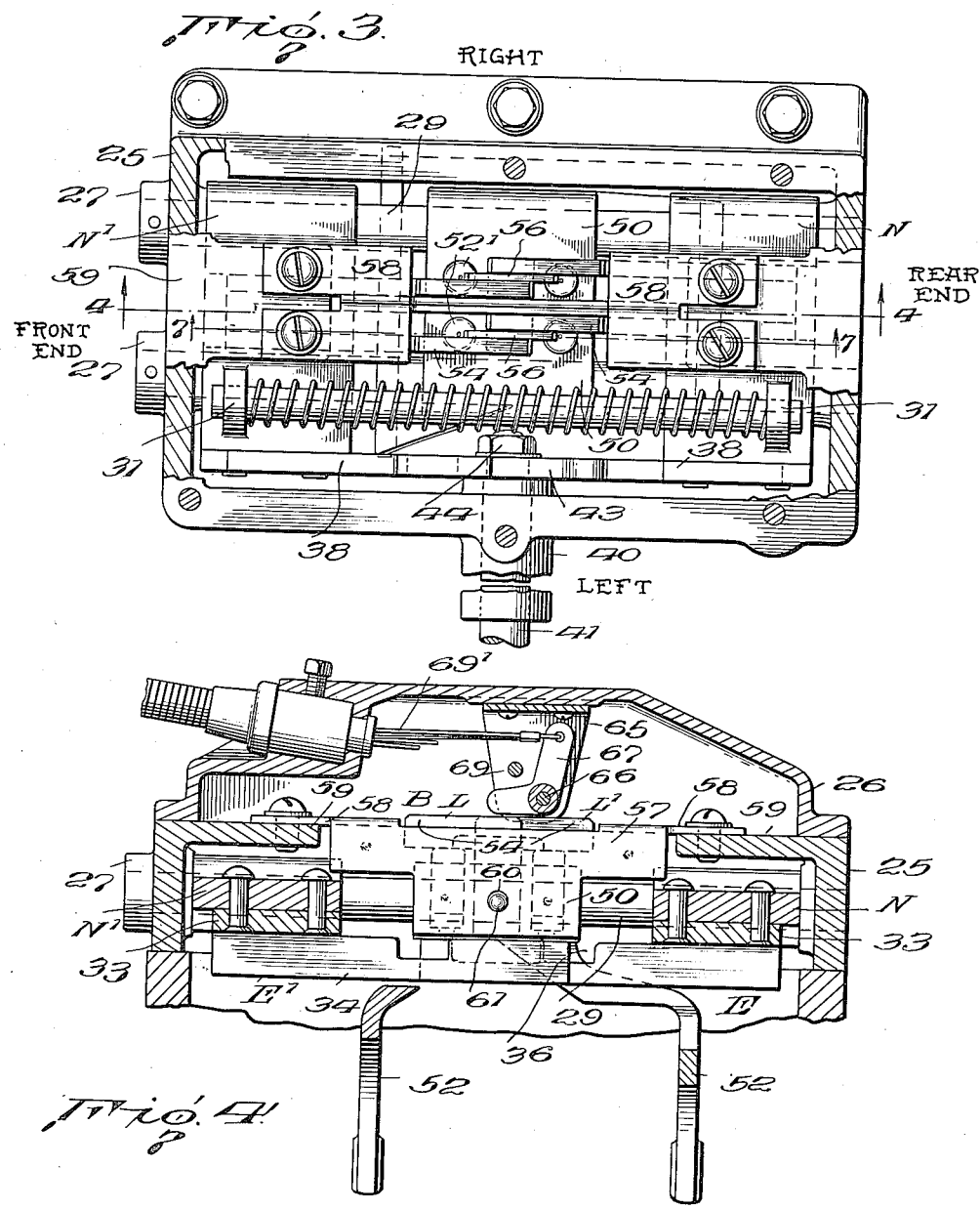

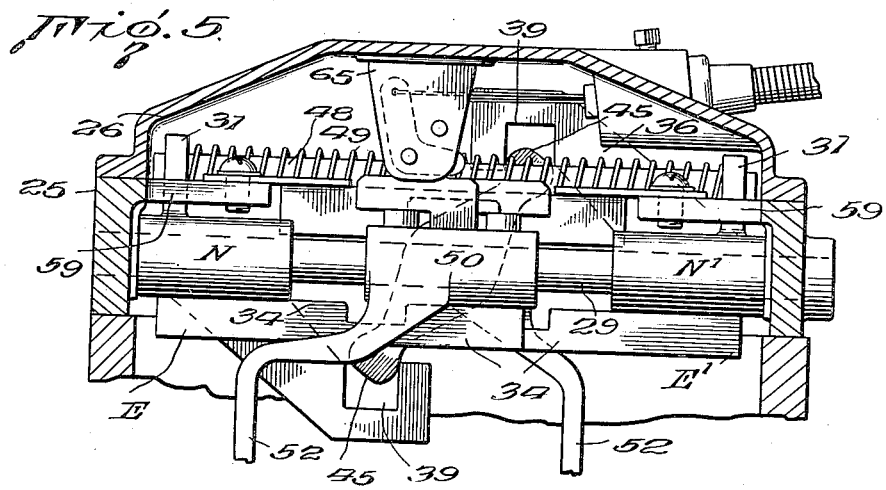
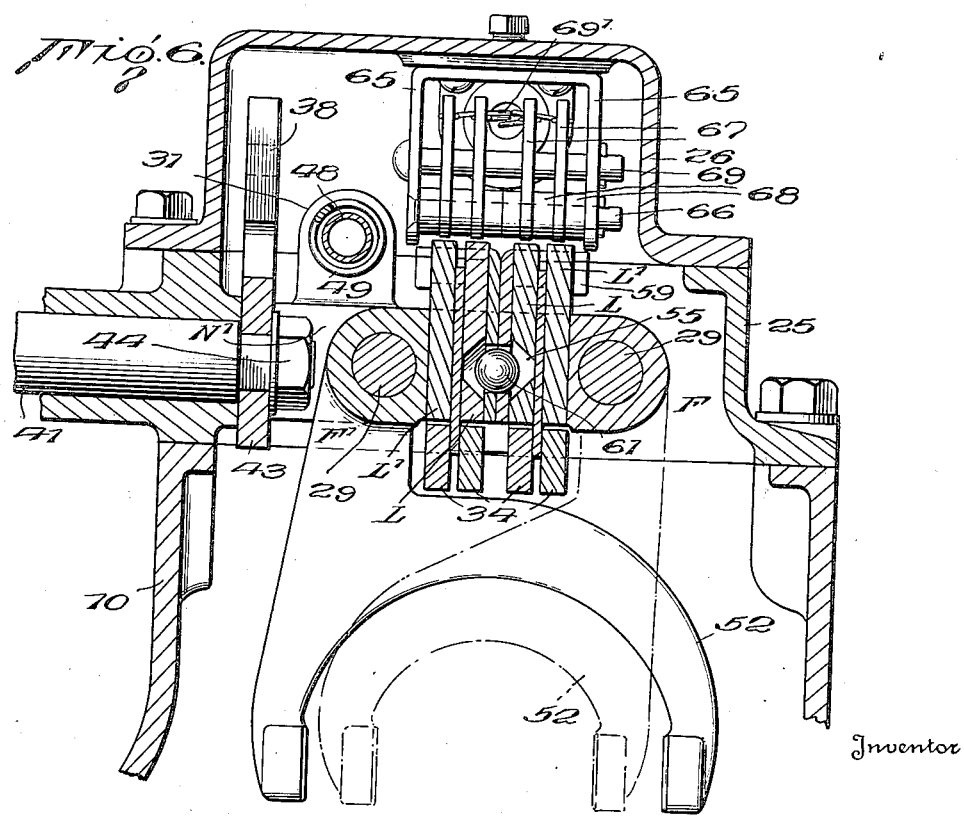

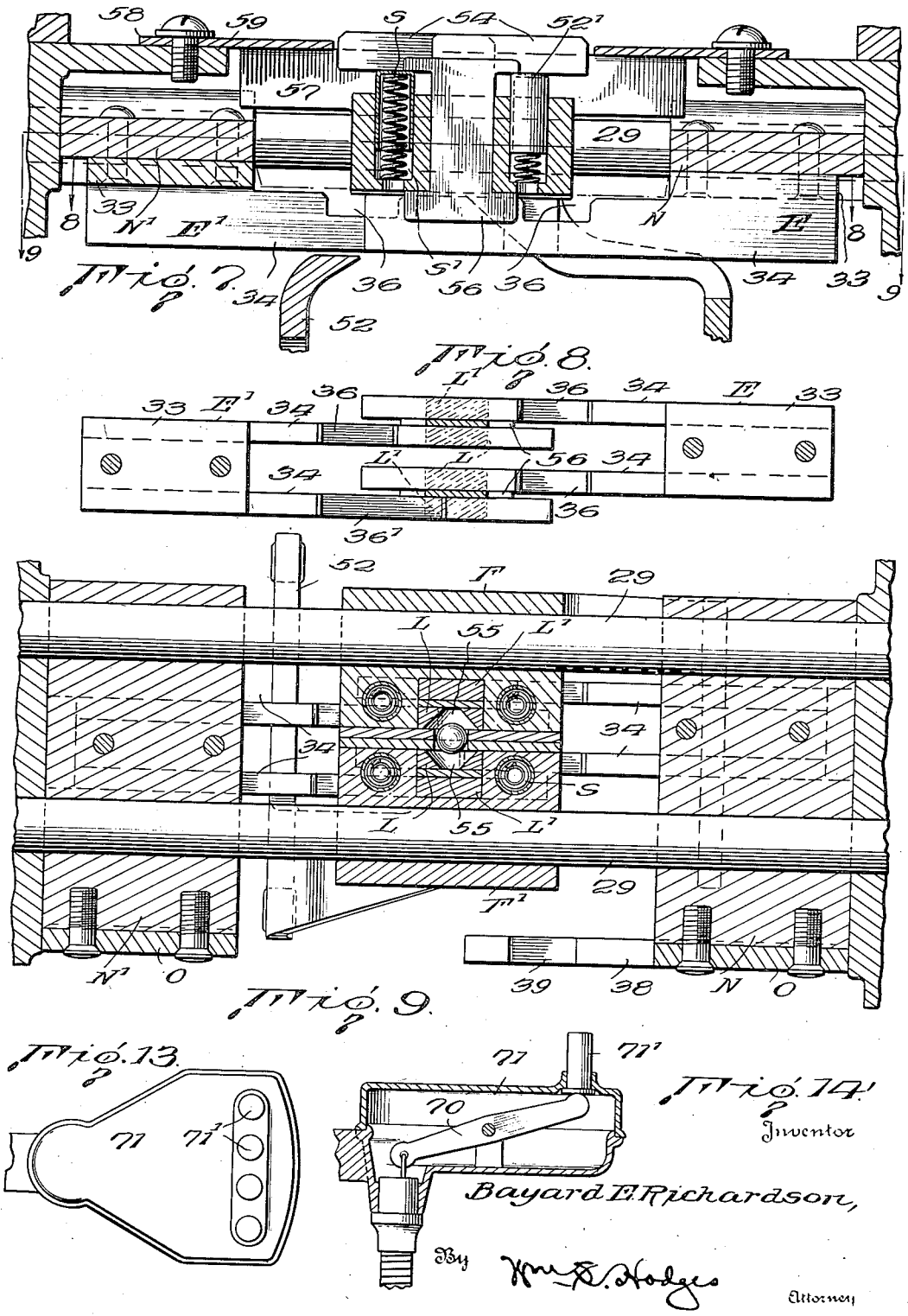

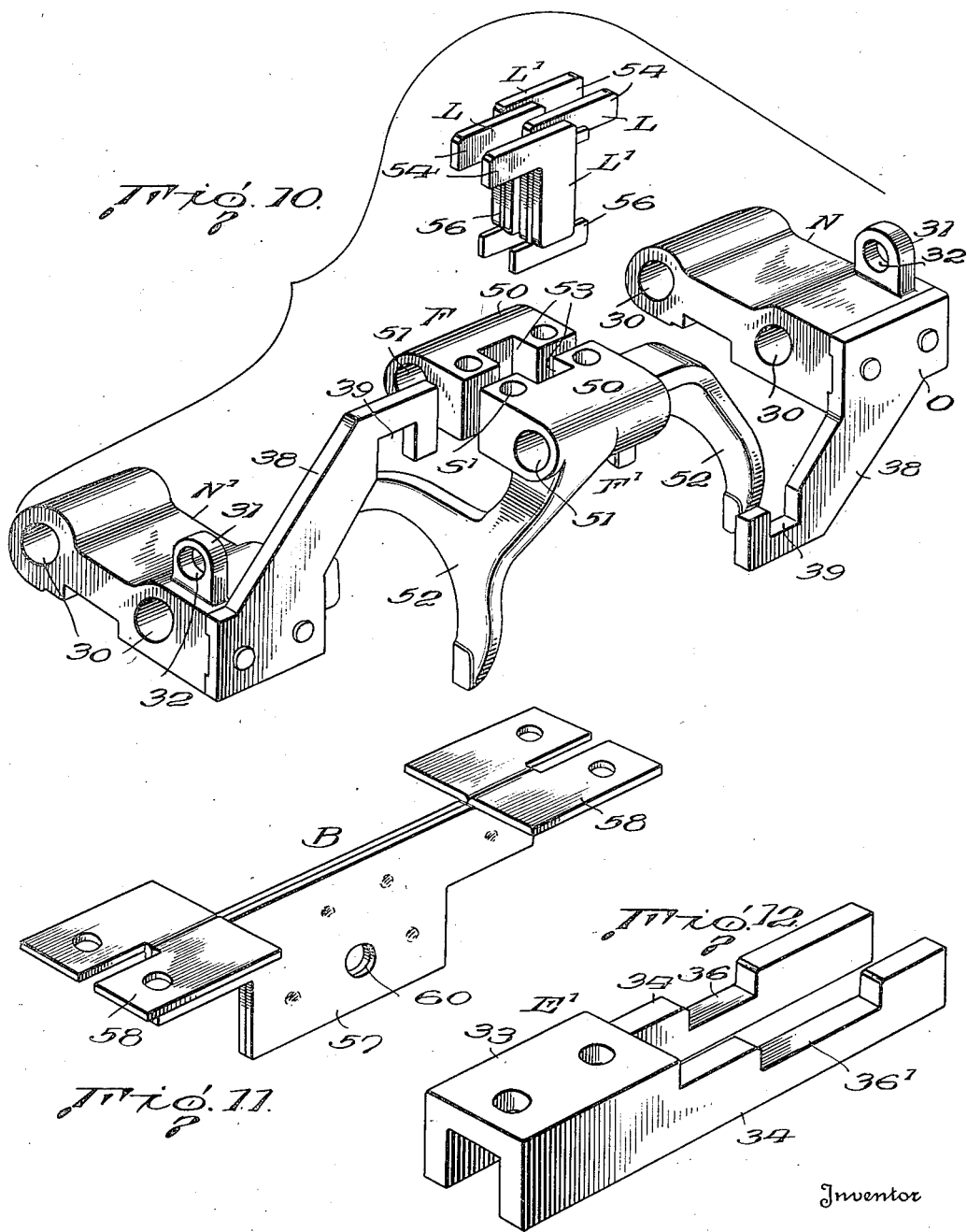

Patented May 4, 1937

2,079,529

UNITED STATES PATENT OFFICE 2,079,529

CONTROL MECHANISM FOR CHANGE SPEED GEAR TRANSMISSIONS

Bayard E. Richardson, Grand Rapids, Mich., assignor to Mechano Gear Shift Company, Grand Rapids, Mich., a corporation of Michigan Application May 17, 1935, Serial No. 22,097

24 Claims. (Cl. 74—334)

This invention is a mechanism for controlling the operation of change-speed gear transmissions of the type commonly employed in the propulsion of motor vehicles, but not limited to the last-mentioned specific use.

One of the objects of the invention is to provide a simple mechanism by means of which a predetermined shiftable change-speed gear may be selected for operation, and then automatically shifted to its pre-selected speed-determining position by means cordinated with movements of the pedal which controls the engine clutch. A further object is to provide shiftable fork members engaging the respective slidable change-speed gears of the transmission, and reciprocable neutralizing members, said fork members and said neutralizing members having complemental means whereby each neutralizing member may be selectively and releasably connected with either of the fork members.. A further object is to provide mechanism of the character mentioned, in which the neutralizing members are reciprocably mounted and yieldably maintained in a normally separated relation. A further object is to provide a controlling mechanism in which the respective neutralizing members are provided with actuator arms disposed opposite to each other and engageable by an oscillatory operating lever, which is actuated in coordination with movements of the pedal which controls the engine clutch, so that on a partial downward movement of the clutch pedal, the engine clutch is first disengaged, and on the complete downward movement the change speed gears are automatically brought to the neutral position where the selection of speed-determining position becomes effective. The selection being made, the partial return movement of the clutch pedal first completes the shift and on the complete return movement re-engages the engine clutch.

The invention will be hereinafter fully set forth and particularly pointed out in the claims.

Referring to the drawings, Figure 1 is a side elevation illustrating a standard type of motor vehicle change-speed gear transmission, with parts broken away and other parts shown in section. Figure 2 is a side elevation, partly in section, of the control mechanism, with the box containing the gear shift mechanism broken away. Figure 3 is a top plan view with parts of the gear-shift box shown in section. Figure 4 is a horizontal sectional view on the line 4—4, Figure 3. Figure 5 is a side elevation similar to Figure 2, but viewed from the opposite direction. Figure 6 is a transverse sectional view on the line 6—6, Figure 2. Figure 7 is an enlarged sectional view illustrating the means for coupling a neutralizing member and a fork member. Figure 8 is a detail plan view illustrating the coupler arms of the neutralizing blocks. Figure 9 is a horizontal sectional view on the line 9—9, Figure 7. Figure 10 is a perspective view illustrating the neutralizing members, the fork members and their adjuncts, and the coupler members in separated positions, the coupler members being shown immediately above the operative positions that they normally occupy. Figure 11 is a perspective view illustrating the ball retainer. Figure 12 is a similar view illustrating a coupling extension of one of the neutralizing members. Figures 13 and 14 are detail, plan and sectional views, respectively, illustrating the means for selecting any predetermined gear ratio.

Referring to the drawings, 10 designates a casing of the usual type employed in change-speed gear transmissions, such for example as those used in association with motor vehicle propulsion. Transmissions of this type include a driven shaft 11 and a counter shaft 12, two selective gears 13 and 14 of different diameters being slidably mounted upon the shaft 11, and three gears 15, 16 and 20 of different diameters being fixedly mounted on the shaft 12. The engine shaft 17 is provided with a suitable clutch and gear member 18 complemental to a toothed clutch element carried by gear 13 on the shaft 11. The clutch member 18 is provided with gear teeth 18ª meshing with a gear 19 on the shaft 12. The gears 15, 16, 19 and 20 are all connected in such manner that they rotate with each other. The structure thus far described consists of a common type of change-speed transmission, in which the shaft 12 is continuously driven in one direction through the inter-engagement of the gears 18ª and 19, the former being directly driven by the engine or prime mover (not shown). The gear 13 may be moved forwardly to connect with a toothed clutch element 21 at the rear of the gear 18 and formed integrally with the latter, or to the rear to connect with gear 15 in an obvious manner. Gear 14 may be moved forwardly to mesh with the pinion 16, or to the rear to engage with the usual reversing pinion which is normally in mesh with the rear pinion 20. Thus a standard sliding gear type of change-speed transmission is provided, whereby the shaft 11 may be driven at three forward speeds with relation to the engine shaft, and at one speed in reverse, as is well known in the art. The standard type of clutch pedal 22 is mounted on a shaft 23, and has the usual operative connections with the clutch (not shown) for disengaging the engine shaft from the driving shaft upon forward movement of the clutch pedal, in a well known manner.

Mounted upon the casing 10 is a gear-shift box 25, which may be removably secured to the casing 10 in any desired manner, said box being provided with a removable cover 26, as shown. One end wall of the box 25 is provided with bosses 27 and openings 28, and the other end is provided with duplicate openings 28 therein positioned opposite to the bosses. Located within the bosses 27 and openings 28, and extending longitudinally of the casing 25, are two guide rods 29, which are normally fixedly held against longitudinal movement relative to said box 25.

Slidably mounted upon both of said rods are two neutralizing blocks N and N', each of which is provided with openings 30 to loosely receive the bars 29, and each provided with an upstanding ear 31, having an opening 32 therein, the purpose of which will be later described. Rigidly connected with recessed portions of the respective neutralizing blocks are coupler extensions E, E', so that each block and its extension will move together. Each coupler extension is provided at one end with a supporting portion 33, by which it is attached to its neutralizing block, and a pair of parallel coupler arms 34, extending longitudinally of the casing toward the central portion of the box 25. Each of said coupler arms is also provided with a notch, one of said notches, indicated at 36', being somewhat longer than the notch 36 of the other coupler arm of the same coupler extension. It will be observed that the coupler arms 34 of each neutralizing block overlap the corresponding arms of the other neutralizing block in alternate relation. Rigidly secured to each neutralizing block N and N' is an operating arm O, which consists of a body portion 37 for attachment to the left face of its neutralizing block, and provided with a longitudinally inclined arm 38, having a notch 39 thereon. It will be observed that the operating arm O of the neutralizing block N depends to a horizontal plane below the plane of the rods 29, and that the arm O of the block N' projects in an opposite direction to a plane above said rods, the two arms O however, being in the same vertical plane but relatively offset with respect to each other.

Rotatively mounted within a sleeve 40, projecting from the left side of the box 25 is a rocker shaft 41, provided with a reduced extension 42 on its inner end, on which is secured an operating lever 43, as for instance by a nut 44. It will be observed that the lever 43 has its ends 45 shaped to enter the respective recesses 39 of the arms O, and that they have normal engagement with said notches 39 when the clutch pedal has been depressed enough to disengage the engine clutch and bring the lever 43 from the position shown by the dotted lines in Figure 2, to the position shown by the solid lines in Figure 2, by clockwise rotation of the rocker shaft 41. Free motion in the rotation of the lever 43 is provided for this purpose. A further rotation of the lever in the same direction and then a return to the position shown by the solid line in Figure 2, will shift the neutralizing blocks by power applied thereto through the connections of the arms O therewith, and by spring 49. The shaft 41 is provided with a crank arm 46, which in turn is connected with the clutch pedal 22, by means of a pitman or rod 47, so that rotations of the rocker shaft 41 are effected simultaneously with movements of the clutch pedal. During all movements of the shifting mechanism there is an absolute and definite mechanical connection between the clutch pedal and the shifting mechanism, with no free or lost motion possible, so that movement of the clutch pedal in either direction is directly and positively transferred to the movement of the neutralizing blocks.

The ears 31 of the neutralizing blocks N and N' support a rod 48, which is held against endwise movement by reason of the depending end walls of the cover 26, and which serves as a guide for a helical spring 49, interposed between the ears 31 in such manner as to yieldably keep the neutralizing blocks normally separated and at the respective ends of the box 25.

The shifter fork members F and F', for the slidable gears, are each constructed of a body portion 50, provided with an opening 51 to slidably engage one of the rods 29, the shifter member F engaging the right rod and the shifter member F' engaging the left rod. Each of the shifter fork members is provided with a fork portion 52, the fork of the shifter fork member F engaging the pinion 14, and the fork 52 of the shifter fork F' engaging the pinion 13, the engagement with the pinions being of such a character that slidable movement applied to the respective fork members will effect a corresponding slidable adjustment of the respective pinions 13 and 14. Each fork member F and F' is provided with a vertical recess 53, in which are slidably mounted two coupler members L and L', respectively. Each coupler member is of inverted L-shape and provided with a horizontal, longitudinally disposed overhanging portion 54, and each coupler member L is provided on one face with a frustoconical recess 55. There is one coupler member L and one coupler member L' in each recess 53, the coupler members of each pair being normally separated by a spacer piece 56. It is to be understood that the vertical portions of the coupler members are normally free to slide vertically within the recesses 53, and that the overhanging extensions of the coupler members of each pair extend in opposite directions longitudinally of the casing. The coupler members L and L' are normally held in elevated positions by means of springs S located in recesses S' in the fork members F and F', provided with retainers 52', which engage the undersides of the respective overhanging portions of said coupler members.

Interposed between the two coupler members L of the respective shifter forks is a ball retainer B, which consists of a depending member 57, provided with lateral and longitudinally supporting end-portions 58, which are secured in suitable manner to lugs 59, which extend longitudinally inward from the end walls of the box 25, in a plane above that of the rods 29. The depending body portion 57 is provided with an opening 60. While the ball retainer B is in proper position, said depending portion lies in a vertical plane corresponding to the longitudinal median line of box 25 in a position intermediate between the planes of the bars 29 in such manner that the body portion 57 engages the inner surfaces of the fork shifter members. In this manner, the lock members L and L' are retained in position during slidable movement of the fork members along the rods 29. It will be observed that the opening 60 also registers with the recesses 55 of the coupler members L while the parts are in normal neutral positions, said recesses being engaged by a ball member 61, which is free to move laterally into either of the recesses 55 of coupler members L. The ball retainer B may be constructed in any suitable or desired manner, but it is preferred to construct it of two parts, which are welded together, as clearly shown in the drawings.

Depending from a central portion of the cover 26 is a support formed with two oppositely disposed arms 65, in which is mounted a pivot shaft 66. Pivotally mounted on said shaft are a plurality of bell crank levers 67, relatively spaced from each other by suitable spacing rings 68 also mounted upon said shaft. Each of said bell crank levers is mounted directly over one of the coupler members L, L' in such manner that rocking of any one of the bell crank levers in one direction will bring the horizontal arm thereof against the coupler member immediately under it, and will depress said member into the notches 36 or 36' of a coupler member E or E', which is directly beneath it unless movement thereof is prevented by one of the coupler arms 34 in a manner to be later described. Pivotal movement of the bell crank levers in the depressing direction is limited by a stop in 69 also supported by the arms 655. The bell crank levers 67 may be actuated in any desired manner. It is preferred to connect them by means of wires 69', with levers 70 pivotally supported in a casing 71 located adjacent the operator's station. Each lever 70 lies beneath a depressible pin 71', positioned adjacent suitable indicia to indicate the change-speed position controlled thereby.

The operation of the device is as follows:

With the parts in neutral positions and the gears 13 and 14 disengaged from the other gears, the neutralizing blocks N and N' are held in separated positions, to the full extent of their separating movement by means of the spring 49, thus bringing the arms O in such positions that the notches 39 thereof are out of engagement with the ends of the lever 43, remaining there until the lever 43 has moved through approximately one half of its rotating movement, from the position shown by the dotted lines in Figure 2 and comes to the position shown by the solid lines in Figure 2. At this time the coupler members E and E' are in positions which will hold all of the lock members L and L' normally against depression. The shifter forks at this time are disposed adjacent each other at positions intermediate between the neutralizing blocks N and N', with the overhanging portions of the coupler members L, L' each directly beneath the bell crank levers 67. Assuming that it is desired to throw the transmission into low gear by shifting of the gear 14 into engagement with the gear 16, the clutch pedal 22 is first shifted to declutch the engine shaft in the usual manner. This will rotate lever 43 into normal contact with notches 39 of arms 38. A continued movement of the clutch lever, however, will, by reason of engagement of lever 43 with the arms 38, bring the neutralizing blocks into engagement with the ends of the shifter fork members. If the fork members F and F' are out of normal neutral positions, this movement of the neutralizing blocks moves said blocks into register with each other, thereby bringing the notches 36 and 36' of the coupler arms E, E' beneath the respective coupler members L and L', it being understood that while the neutralizing blocks are in extended relation, the upper edges of the arms 34 normally hold all of the coupler members L and L' against depression, and also that when one fork member is in a shifted position, one coupler member being engaged, the upper edges of the arms 34 hold the other three coupler members L and L' against depression. However, when the neutralizing blocks have been moved into engagement with the fork members, the notches 36 and 36', as above stated, are immediately beneath the respective coupler members, whereupon the operator presses the pin 71', which is arranged to indicate the low gear position. This effects a rocking of the bell crank lever 67, which lies directly over the overhanging extension 54 of the coupler member L carried by the fork-carrying member F, so that said coupler member L will be depressed into the notch 36 of the coupling extension E' carried by the block N', and the overhanging portion 54 will be below end portion 58 of ball retainer B. Thereupon, pressure on the clutch pedal 22 is released and as it is brought back to its normal engine clutching position, the spring pressure of the disengaged clutch transmitted through the pitman 47, lever 46, rock shaft 41, lever 43 and arms 38, and the spring 49 causes the neutralizing blocks N and N' to separate to their normal positions, with the result that the coupler member L of block F, being interlocked with the notch 36 of the coupler extension E' of said block N', will move the fork block F to the front a sufficient distance to bring its fork and the pinion 14 to the position to fully engage gears 16 before the normal engine clutching position is reached. In this manner, the gear 14 is automatically shifted to its new position before the clutch pedal is returned to clutching position, because the shift must be completed before ends 45 of lever 43 can come out of recesses 39 of the arms 38 and allow further movement of the clutch pedal for re-engagement of the engine clutch, and the desired change in vehicle speed is effected. Assuming that it is desirable to shift to the next higher speed by engaging gears 13 and 15, the pedal is again moved to de-clutching position and beyond to the extent of its full travel, whereby the neutralizing blocks N and N' are again brought to the intermediate position by the lever 43, thereby at the same time shifting the fork block F and gear 14 to their neutral positions, whereupon the notches in the extensions E and E' are again brought into positions beneath the coupler members L and L'. During these operations, the ball 61 is moved laterally into the recess 55 of the coupler member L, which is carried by the fork member F', so as to retain said fork member in the central intermediate position. The fork member is also retained by the ends 54 of coupler members L and L' and the end portions 58 of ball retainer B. The ball 61 also has other functions as explained later. By then depressing the properly indicated bell crank lever, the coupler member L of fork member F' is depressed, so as to engage said fork member with the notch 36 of coupler member E, and thereupon as the clutch pedal is again withdrawn, the neutralizing blocks are separated, carrying the fork member F' to a position to engage the gear 13 with the gear 15, the fork member F being locked in the same manner as explained above.

In case the operator should inadvertently select two gears at once, shifted by the same fork member, the motivating force for shifting furnished by spring 49 would be directly opposed to itself through arms E, E' and the fork would not move. Should he select two gears, one shifted by each fork, the force for shifting would not be opposed, but the ball 61 would prevent movement of either fork until one or the other of the selections was released by the operator. Then the fork that was selected would move the ball laterally into the recess of the coupler member carried by the other.

It will be noted that in each operation, as the neutralizing members move to their separated positions, the L-shaped coupler members carried by the fork member which moves the selected gear, are moved to positions beneath one or the other of the overhanging flanges 58, and thereby retained in its depressed position until the parts are again shifted to neutralizing position. The length of the overhanging portions 54 of the lock members is sufficient to insure that the selected bell crank lever will maintain its pressure upon its correlated coupler member until the overhanging portion of said lock member has moved beneath said locking flanges. It should also be understood that the recesses 36 and 36' can be of any length greater than the width of the coupler members L, L', so as to provide a certain amount of lost motion to provide for different distances of travel necessary to effect full gear engagement. It will be seen on Fig. 1 that less movement of the gear 13 is necessary when shifting into high, so lost motion is provided by increasing the length of 36'.

The advantages of the invention will be readily understood by those skilled in the art to which it belongs. For instance, it will be observed that a very simple form of control mechanism is provided, which is capable of selecting a predetermined change-speed gear only after the gears are automatically neutralized, and then to automatically shift the selected gear to its adjusted speed-determining position, all movements of the shift mechanism being co-ordinated with movements of the pedal which controls the engine clutch. A further advantage is that the control mechanism may be added as a unit to any of the standard types of change-speed gear transmissions now in general use on motor vehicles, without substantial change in such transmissions, and with but slight changes in design to meet the requirements of the various transmissions. A further advantage is that a very simple and efficient means is provided for selectively coupling either of the gear-shifting fork members with the neutralizing members, which in turn are operated by movement of the clutch pedal, and to automatically uncouple said members when they are returned to normal neutral positions. Another advantage is that all of the parts of the operating mechanism, except the crank arm and the pitman or rod connecting the clutch pedal and the rocker shaft which engage and operate the neutralizing members, are contained within a closed casing, so that a very compact mechanism control of a minimum number of parts is provided. A very important advantage is that the connection between the clutch pedal and the neutralizing members is such that the clutch lever cannot return to its normal position after being moved to declutched position preliminary to shifting a gear, until the gear shifting operation is completed, due to the fact that the ends of the lever 43 are in engagement with the recessed ends of the arms 38, and return movement of the clutch pedal is prevented until said lever 43 is disengaged from said arms.

Having thus explained the nature of the invention and described an operative manner of constructing and using the same, although without attempting to set forth all of the forms in which it may be made, or all of the forms of its use, what is claimed is:—

1. Control mechanism for change-speed gear transmissions, comprising relatively spaced slidably mounted neutralizing members, slidably mounted fork-carrying members located between the neutralizing members, yieldable means interposed between and engaging the neutralizing members in such manner as to hold them in normally spaced relation, selective coupling means consisting of longitudinally disposed coupling arms fixedly carried by the respective neutralizing members and complemental coupler elements movably mounted in the respective fork-carrying members at positions to selectively engage said coupler arms, means for yieldably urging said coupler elements to normally disengaged positions, and means for selectively moving said elements in opposition to said yieldable means.

2. Control mechanism for change-speed gear transmissions, comprising relatively spaced slidably mounted neutralizing members provided with operating arms, slidably mounted fork-carrying members located between the neutralizing members, yieldable means interposed between and engaging the neutralizing members in such manner as to hold them in normally spaced relation, selective coupling means consisting of complemental interengageable members carried by the neutralizing members and the fork-carrying members respectively, and an oscillatory lever so arranged that the ends thereof are engageable with the respective operating arms in such manner as to move said neutralizing members toward the fork-carrying members in opposition to the tension of said yieldable means.

3. Control mechanism for change-speed gear transmissions, comprising relatively spaced slidably mounted neutralizing members, slidably mounted fork-carrying members located between the neutralizing members, yieldable means interposed between and engaging the neutralizing members in such manner as to hold them in normally spaced relation, coupling arms rigidly carried by the neutralizing members, a plurality of selective coupler members slidably supported by said fork members and engageable with said coupling arms in such manner as to temporarily connect a fork-carrying member with a neutralizing member, and an oscillatory member located between the neutralizing members and engageable therewith for temporarily moving said neutralizing members toward said fork-carrying members.

4. Control mechanism for change-speed gear transmissions, comprising relatively spaced slidably mounted neutralizing members, slidably mounted fork-carrying members located between the neutralizing members, yieldable means interposed between and engaging the neutralizing members in such manner as to hold them in normally spaced relation, pairs of coupling arms secured to the respective neutralizing members and extended beneath the respective fork members, the coupling arms of each neutralizing member being staggered with respect to the coupling arms of the other neutralizing member, vertically slidable coupler members carried by the respective fork-carrying members and engageable with the respective coupler arms in such manner as to temporarily connect a neutralizing member with a fork-carrying member, and means for temporarily moving said neutralizing members toward said fork-carrying members.

5. Control mechanism for change-speed gear transmissions, comprising longitudinally spaced slidably mounted neutralizing members each provided with a notched operating arm, said operating arms being in the same vertical plane but in different horizontal planes, slidably mounted fork-carrying members located between the neutralizing members, yieldable means interposed between and engaging the neutralizing members in such manner as to normally hold them in spaced relation, selectively operable means consisting of complemental coupling members carried by the neutralizing members and the fork-carrying members respectively, and an oscillatory operating lever having its ends positioned to engage with the notches of said operating arms.

6. Control mechanism for change-speed gear transmissions, comprising longitudinally spaced slidably mounted neutralizing members each having an operating arm on one side and a coupling member on its underside, said coupling members being extended longitudinally from said neutralizing members and toward each other, slidably mounted fork-carrying members located between the neutralizing members, yieldable means interposed between and engaging the neutralizing members in such manner as to hold them in normally spaced relation, selectively operable coupling elements mounted in the fork-carrying members and engageable with the coupling arms of the respective neutralizing members and so constructed and arranged as to temporarily couple a fork member and a neutralizing member, and means engageable with said operating arms for temporarily moving said neutralizing members toward said fork-carrying members.

7. Control mechanism for change-speed gear transmissions, comprising a pair of stationary parallel guide rods, neutralizing blocks each slidably mounted on both of said rods, means for yieldably maintaining said neutralizing blocks in normally spaced relation, fork-carrying members slidably mounted on the respective guide rods between said neutralizing blocks, means for releasably coupling each neutralizing block with either fork-carrying member in predetermined relatively adjusted positions, and means for temporarily moving said neutralizing blocks toward said fork-carrying members.

8. Control mechanism for change-speed gear transmissions, comprising a pair of stationary parallel guide rods, neutralizing blocks each slidably mounted on both of said rods, means for yieldably maintaining said neutralizing blocks in normally spaced relation, fork-carrying members slidably mounted on the respective guide rods between said neutralizing blocks, coupler arms extended longitudinally from the respective neutralizing blocks to positions beneath the respective fork-carrying members, selectively operable coupler members carried by the respective fork-carrying members and engageable with said coupler arms in such manner as to couple a fork-carrying member to a neutralizing member, and means for temporarily moving the neutralizing blocks toward said fork-carrying members.

9. Control mechanism for change-speed gear transmissions, comprising relatively spaced slidably mounted neutralizing members, a guide member positioned above and loosely supported by said neutralizing members in such manner as to permit relative slidable movement of said members, a spring supported by said guide member and acting to normally maintain the neutralizing blocks in yieldably separated relation, reciprocably mounted fork-carrying members located between the neutralizing members, selective means consisting of complemental coupling members carried by the neutralizing members and the fork-carrying members respectively, for temporarily coupling a neutralizing member to a fork-carrying member, and means for temporarily moving said neutralizing members toward said fork-carrying members.

10. Control mechanism for change-speed gear transmissions, comprising relatively spaced slidably supported neutralizing members, each provided with an ear projecting upwardly from the top thereof, a normally stationary rod supported by said ears in such manner as to permit relative movement of said neutralizing members, a spring encircling said rod and engaging said ears in such manner as to maintain the neutralizing members in yieldable normally spaced relation, reciprocably mounted fork-carrying members located between the neutralizing members, selective means consisting of complemental coupling members carried by the neutralizing members and the fork-carrying members respectively, for temporarily coupling a neutralizing member to a fork-carrying member, and means for temporarily moving said neutralizing members toward said fork-carrying members.

11. Control mechanism for change-speed gear transmissions, comprising relatively spaced slidably supported neutralizing members, slidably mounted fork-carrying members located between the neutralizing members, yieldable means interposed between and engaging the neutralizing members in such manner as to hold them in normally spaced relation, said yieldable means occupying a position above the neutralizing members and the fork-carrying members, coupling arms fixedly connected with the respective neutralizing members and projected beneath the respective fork-carrying members, coupler elements carried by the respective fork-carrying members and selectively engageable with the coupling arm in such manner as to temporarily connect either neutralizing member with a fork-carrying member, a longitudinal lock plate interposed between the fork members and in contact therewith, locking means carried by said lock plate for releasably holding either fork member against relative movement, and means for temporarily moving said neutralizing members toward said fork-carrying members.

12. Control mechanism for change-speed gear transmissions, comprising relatively spaced slidably supported neutralizing members, slidably mounted fork-carrying members located between the neutralizing members, yieldable means interposed between and engaging the neutralizing members in such manner as to hold them in normally spaced relation, coupling arms fixedly connected with the respective neutralizing members and projected beneath the respective fork-carrying members, coupler elements complemental to the coupling arms, said elements being slidably supported by the respective fork-carrying members at positions to selectively engage the complemental coupling arms in such manner as to temporarily connect a neutralizing member with a fork-carrying member, means for yieldably urging said coupling members to normally disengaged positions, a fixedly secured lock plate disposed between the fork members and engaging them, said lock plate having laterally disposed flanges at its ends so positioned as to prevent movement of the coupler elements under the influence of said yieldable urging means while located beneath the flanges, a freely movable locking member carried by said lock plate and engageable with adjacent coupler members in such manner as to releasably hold either fork member against relative movement, and means for temporarily moving said neutralizing members toward said fork-carrying members.

13. Control mechanism for change-speed gear transmission, comprising relatively spaced slidably supported neutralizing members, slidably mounted fork-carrying members located between the neutralizing members, a spring interposed between and engaging the neutralizing members in such manner as to hold them in normally spaced relation, said spring being supported by the neutralizing members in a position extending over the neutralizing members and said fork-carrying members, coupling arms fixedly connected with the respective neutralizing members and projected beneath the respective fork-carrying members, coupler elements complemental to said coupling arms, said members being slidably supported by the respective fork-carrying members at positions to selectively engage the complemental coupling arms in such manner as to temporarily connect a neutralizing member with a fork-carrying member, means for yieldably urging said coupler elements to normally disengaged positions, a longitudinally disposed fixedly supported lock plate having a depending body portion interposed between and engaging the respective fork-carrying members, said lock plate having longitudinally extended arms provided with means for maintaining a selected coupler member in coupling relation while the neutralizing members are maintained in normal positions, and means for temporarily moving the neutralizing members toward said fork-carrying members.

14. Control mechanism for change-speed gear transmissions, comprising relatively spaced slidably supported neutralizing members, slidably mounted fork-carrying members located between the neutralizing members, yieldable means located above and interposed between and engaging the neutralizing members in such manner as to hold them in normally spaced relation, coupling arms fixedly connected with the respective neutralizing members and projected beneath the respective fork-carrying members, coupler elements complemental to said coupling arms, said members being slidably supported by the respective fork-carrying members at positions to selectively engage the complemental coupling arms in such manner as to temporarily connect a neutralizing member with a fork-carrying member, means for yieldably urging said coupler elements to normally disengaged positions, a lock plate having a depending body portion and longitudinally extended support portions, said body portion being interposed between and engaging both fork-carrying members, the supporting portion of said lock plate having flanges engageable with the tops of the coupler elements while in coupled relation, locking means carried by the body portion of said lock plate and selectively engageable with adjacent coupler members carried by the respective fork-carrying members, and means for temporarily moving said neutralizing members toward said fork-carrying members.

15. Control mechanism for change-speed gear transmissions, comprising a pair of stationary parallel guide rods, neutralizing members each slidably mounted on both of said rods, means located above the neutralizing members for maintaining said neutralizing members in normally spaced relation, fork-carrying members slidably mounted on the respective guide rods at positions between said neutralizing members, notched coupler arms carried by the respective neutralizing members and extended longitudinally beneath the respective fork-carrying members, selective coupler members movably supported by the fork-carrying members and engageable with the notches of the coupler members, springs normally acting to hold said coupler members out of engagement with said notches, a longitudinally disposed lock plate interposed between the fork-carrying members and engaging both of them, locking means carried by the lock plate and selectively engageable with adjacent coupler members of the respective fork-carrying members, and means for temporarily moving the neutralizing members toward said fork-carrying members.

16. Control mechanism for change-speed gear transmission, comprising a pair of stationary parallel guide rods, neutralizing members each slidably mounted on both of said rods, means for maintaining said neutralizing members in normally spaced relation, fork-carrying members slidably mounted on the respective guide rods at positions between said neutralizing members, notched coupler arms carried by the respective neutralizing members and extended longitudinally beneath the respective fork-carrying members, selective coupler members movably supported by the fork-carrying members and engageable with the notches of the coupler members, a longitudinally disposed lock plate interposed between the fork-carrying members and engaging both of them, locking means carried by the lock plate and selectively engageable with adjacent coupler members of the respective fork-carrying members, and means for temporarily moving the neutralizing members toward said fork-carrying members, said lock member having laterally disposed flanges engageable with the respective coupler members while the latter are in coupled engagement with said coupling arms.

17. Control mechanism for change-speed gear transmissions, comprising a pair of stationary parallel guide rods, neutralizing members each slidably mounted on both of said rods, a guide rod supported by said neutralizing members in such manner as to permit relative movement of the neutralizing members, a spring supported by said guide rod and engaging the neutralizing members in such manner as to hold them in normally spaced relation, fork-carrying members slidably mounted on the respective guide rods at positions between said neutralizing members, notched coupler arms carried by the respective neutralizing members and extended longitudinally beneath the respective fork-carrying members, selective coupler members movably supported by the fork-carrying members and engageable with the notches of the coupler members, a longitudinally disposed lock plate interposed between the fork-carrying members and engaging both of them, locking means carried by the lock plate and selectively engageable with adjacent coupler members of the respective fork-carrying members, and means for temporarily moving the neutralizing members toward said fork-carrying members.

18. Control mechanism for change-speed gear transmissions, comprising a box provided with a removable cover, said box having inwardly extended support lugs at its ends, longitudinally spaced slidably mounted neutralizing members located within said box, slidably mounted fork-carrying members also located within said box between the neutralizing members, yieldable means interposed between and engaging the neutralizing members in such manner as to hold them in normally spaced relation, coupler arms carried by the respective neutralizing members, selectively operable coupler members complemental to said coupler arms and movably supported by said fork-carrying members, a lock member supported by said support lugs and provided with a portion extended beneath and engaging the fork-carrying members, means carried by said lock member for releasably holding the fork members against relative movement, said lock member having flanges engageable with the respective coupler members while in coupled relation, and means within said box for temporarily moving the neutralizing members toward said fork-carrying members.

19. Control mechanism for change-speed gear transmissions, comprising a box having a cover, longitudinally spaced slidably mounted neutralizing members located within said box, slidably mounted fork-carrying members also located in said box between the neutralizing members, a guide rod loosely supported by said neutralizing members in such manner as to permit relative movement of the neutralizing members, longitudinal movement of said rod being prevented by said cover, a spring encircling said rod and engaging both neutralizing members in such manner as to hold them in normally spaced relation, selective means consisting of complemental engaging members carried by the neutralizing members and the fork-carrying members respectively, and means for temporarily moving the neutralizing members toward said fork-carrying members.

20. Control mechanism for change-speed gear transmissions, comprising relatively spaced slidably supported neutralizing members, slidably mounted fork-carrying members located between the neutralizing members, yieldable means interposed between and engaging the neutralizing members in such manner as to hold them in normally spaced relation, coupling arms fixedly connected with the respective neutralizing members and projected beneath the respective fork-carrying members, coupler members carried by the respective fork-carrying members and selectively engageable with the coupling arms in such manner as to temporarily connect a neutralizing member with a fork-carrying member, springs acting normally to move said coupler members away from said coupling arms, a longitudinal lock plate interposed between the fork members and in contact therewith, locking means carried by said lock plate for releasably holding either fork member against relative movement, means for temporarily moving said neutralizing members toward said fork-carrying members, a plurality of bell crank levers, there being one bell crank lever for each of said coupler members, means for supporting the bell crank levers over the respective coupler members and in operative engagement therewith, and means for selectively operating each bell crank lever so as to move a coupler member against the tension of its springs and causing it to engage with a neutralizing member.

21. In a control mechanism for change speed gear transmissions, the combination with a transmission-control-clutch pedal, of fork carrying members for operating shiftable gears, relatively spaced slidably mounted neutralizing members, selective means for engaging either neutralizing member with either fork carrying member, means for yieldably holding the neutralizing members in normally spaced relation, and means providing a temporary positive connection between the clutch pedal and the neutralizing member, said connection being so constructed and arranged as to prevent return of the clutch pedal to normal position until the gear shifting operation has been completed.

22. In a control mechanism for change-speed gear transmissions, the combination with a transmission-controlling-clutch pedal, of fork carrying members for operating shiftable gears, relatively spaced slidably mounted neutralizing members, selective means for engaging either neutralizing member with either fork carrying member, means for yieldably holding the neutralizing members in normally spaced relation, an operating arm connected with said clutch pedal and so positioned as to have temporary positive engagement with both neutralizing members, said operating arm and said neutralizing members being so constructed and arranged as to prevent return of the clutch pedal to its normal position until the gear shifting operation has been completed.

23. In a control mechanism for change-speed gear transmissions, the combination with a transmission-controlling-clutch pedal and an operating arm connected with the clutch pedal, of fork carrying members for operating shiftable gears, relatively spaced slidably mounted neutralizing members having portions engageable with the respective ends of said operating arm, selective means for engaging either neutralizing member with either fork carrying member, and means for yieldably holding the neutralizing members in normally spaced relation, the engageable portions of said neutralizing members being so positioned with respect to said operating arm as to be engageable by the ends of said arm during movement thereof, said operating arm and said engaging portions being so constructed and arranged as to prevent return of the clutch pedal to normal position until the gear shifting operation has been completed.

24. In a control mechanism for change-speed gear transmissions, the combination with a transmission-controlling-clutch pedal, a rock shaft connected with said pedal and an operating arm mounted on and movable with said rock shaft, of fork carrying members for operating shiftable gears, relatively spaced slidably mounted neutralizing members engageable with the ends of said operating arm, selective means for engaging either neutralizing member with either fork carrying member, and means for yieldably holding the neutralizing members in spaced relation, said operating arm and said neutralizing members being so constructed and arranged as to prevent return of the clutch pedal to normal position until the gear shifting operation has been completed.

BAYARD E. RICHARDSON.